Patented Feb. 5, 1935

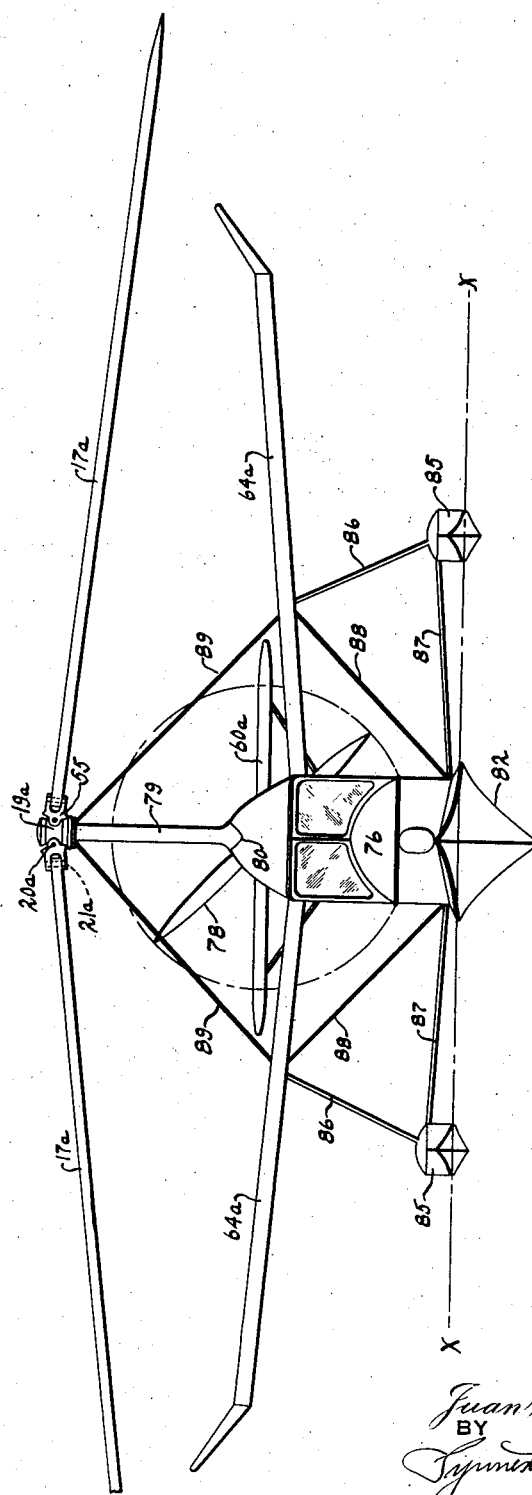

1,990,269

UNITED STATES PATENT OFFICE 1,990,269

AIRCRAFT

Juan de la Cierva, Madrid, Spain, assignor to Autogiro Company of America, Philadelphia, Pa., a corporation of Delaware Application February 5, 1932, Serial No. 591,096

8 Claims. (Cl. 244—19)

This invention relates to aircraft, and is especially concerned with a novel type of craft adapted to take off from and land on the surface of any suitable body of water. More particularly, the invention has in view the provision of a craft having a rotor of the pivoted and rotatably mounted blade or wing type which is constructed in a novel manner in order to permit take-off of the craft from a body of water at a relatively steep angle and also in order to permit alighting or landing of the craft on a suitable body of water even by vertical or substantially vertical descent.

Generally speaking, therefore, this invention has in view construction of an aircraft of the type particularly above referred to which may readily, conveniently and efficiently be manipulated and controlled, under all conditions of operation, and in considering some of the more or less detailed objects and advantages of the present invention, certain rather unusual and outstanding operating characteristics of the pivotally and rotatably mounted sustaining blade type of craft should first be noted.

A craft of the type here involved has, as its primary means of sustention, a rotor system of pivotally and rotatably mounted wings or blades which are arranged for normal actuation under the influence of relative air flow and which are free to assume, at all times, positions of equilibrium between centrifugal, lift, drag and antidrag, and other forces acting thereon when the craft is at rest as well as when the craft is in full flight. Such a craft is capable of taking off and climbing at relatively high angles, even at very low forward speeds, and is further capable of making vertical or at least substantially vertical descent to a landing. In view of these characteristics, I contemplate constructing the craft, especially the float means therefor, in such manner as to facilitate take-off from the surface of the water at the relatively high angles above referred to as well as to provide for ample and efficient cushioning of landing shocks even when made by vertical descent. With the first of these two features in mind, i. e., high take-off angle, the present invention has in view construction of the float means for the craft in such manner as to provide for support of the craft, when at rest or substantially at rest on the water, at a substantially angled position, or construction of the float means in such manner as to permit, by manipulation of the usual controls, suitable relatively high tilting or angling of the craft, even at relatively low forward speeds, so that steep take-off may be had, and further to provide for take-off after an exceptionally short travel of the craft in the water.

As to the second of the two features above referred to, i. e., vertical or substantially vertical descent, it is an object of this invention to construct the float means of relatively great displacement or capacity, and to utilize float means of relatively deep V-form in order to effectively cushion and disperse the landing shocks. Such floats, furthermore, are relatively widely spaced from each other, particularly transversely of the craft, with a view to providing an extended base of support. This latter feature is of especial advantage and importance in a craft of the type here under consideration, in view of the fact that the craft has a relatively high center of gravity and also since the lift of the rotor increases very materially when the rotor is angled upwardly and forwardly with respect to a wind. In accordance with this invention, therefore, I have provided a relatively wide base of support in order to prevent undesired tilting of the craft when landing or taking off in a steady wind or in gusty air.

Further, in view of the operating characteristics just referred to, I prefer to construct the float means in such manner that the craft may remain at rest on a body of water with the general plane or path of travel of the rotor blades substantially horizontally disposed. When the craft is so supported, the lift of the rotating wings is kept at a low value and, as a result, the likelihood of the craft being tipped over, as by gusty air, is substantially eliminated. At the same time, however, and as pointed out above, the float means are preferably so arranged as either to permit ready tilting of the craft for purposes of take-off or to provide for a bodily and more or less predetermined shift in the angle at which the craft may be supported, at rest, for the same purpose.

Another feature of considerable importance is involved in the use of rudders or the like mounted on the craft to be submerged in the water and arranged to aid in counteracting the torque which may be produced in the body of the craft when starting the rotor preparatory to taking off or when slowing down and bringing the rotor to a stop after making a landing. For these purposes, the craft is preferably provided with a mechanical starter, which may take the form of a driving connection between the rotor and the forward propulsion means of the craft, and also with a brake mechanism for the rotor, both of which may be suitably controlled from a cockpit or an occupants' compartment provided in the body. Thus, in starting the rotor prior to taking off from the water, the starter mechanism referred to may be employed to initiate rotation of the sustaining blades and the counter torque set up in the body of the craft may conveniently be taken care of by means of the rudder or rudders provided, so that the craft may readily be maneuvered and maintained in proper position for the take-off. The rudder means are also arranged to be effective in counteracting the twisting moment set up by application of the rotor brake, so that, in landing, the craft may be maintained in the proper position with respect to the wind and may also be maneuvered to the best position for bringing the rotor to a stop.

The present invention further contemplates the use of float means in a craft of the character above referred to, such float means being of a form which is highly efficient aerodynamically, so that parasite drag and the like, in flight, are maintained at an extremely low value. In considering this feature, attention is called to the fact that in accordance with standard hydroplane and flying boat practice, the float means employed are of the "stepped" type, that is, the floats are provided with a shoulder or step in the under surface thereof. This, according to relatively widely accepted practice, is intended to reduce the friction and suction in the water in order to facilitate take-off. However, the "stepped" float construction is relatively inefficient in the air, i. e., aerodynamically, and with a view to overcoming the resultant net inefficiency of the craft, the present invention contemplates an aircraft, capable of take-off at very low forward speeds and the use of float devices which are highly efficient aerodynamically.

While various features of this invention do not positively exclude the use of float means of stepped formation, at the same time, I prefer to improve the general efficiency of the craft by employing floats which are constructed to conform more accurately to an aerodynamically efficient shape. Additionally, this invention contemplates the use of float and hull structures of such form that when the craft is tilted substantially for purposes of take-off, the contact of the water with the floats, and consequently the drag in the water, is materially reduced, in order to assist in making take-offs at the relatively steep angles and yet low forward speeds which I contemplate.

Other more or less detailed objects and advantages, all of which will more fully appear hereinafter, include a novel arrangement of engine and propeller mounting in association with a rotor mounting structure, this arrangement being particularly adaptable to the flying boat type of craft. Another object herein contemplated is the use of supplemental fixed lifting surfaces to carry stabilizer and control elements and also to provide relatively widely spaced points of support for the float devices. In accordance with this invention, furthermore, the floats, in addition to being widely spaced apart, are mounted at considerably lower points than has been customary in the construction of the fixed wing type of aircraft adapted to land on and take off from a body of water.

How the foregoing objects and advantages are obtained together with others which will occur to those skilled in the art will be apparent from a consideration of the following description making reference to the accompanying drawings in which I have illustrated craft of several different types embodying various features and characteristics above enumerated. In the drawings—

Figure 7 is a front view of the craft shown in Figures 5 and 6.

Figure 1:
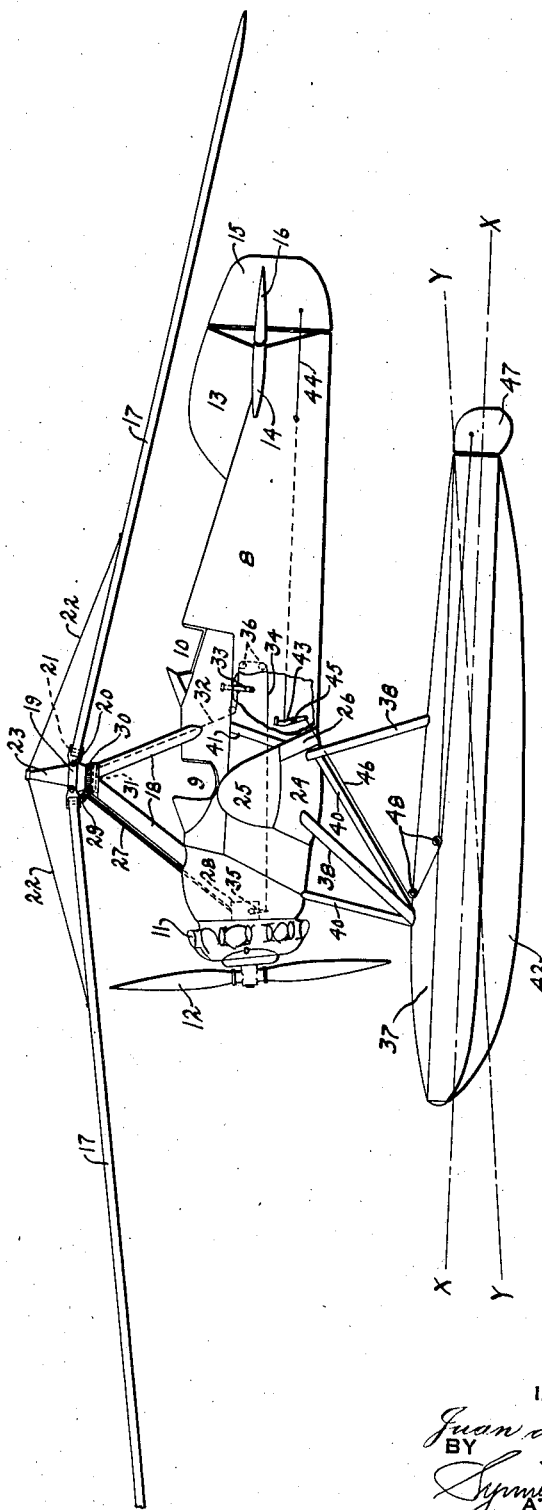
Figure 1 is a side elevational view of one type of craft, with certain parts broken away, constructed to incorporate various features above referred to, this craft being of the double pontoon or float type.
Figure 2:
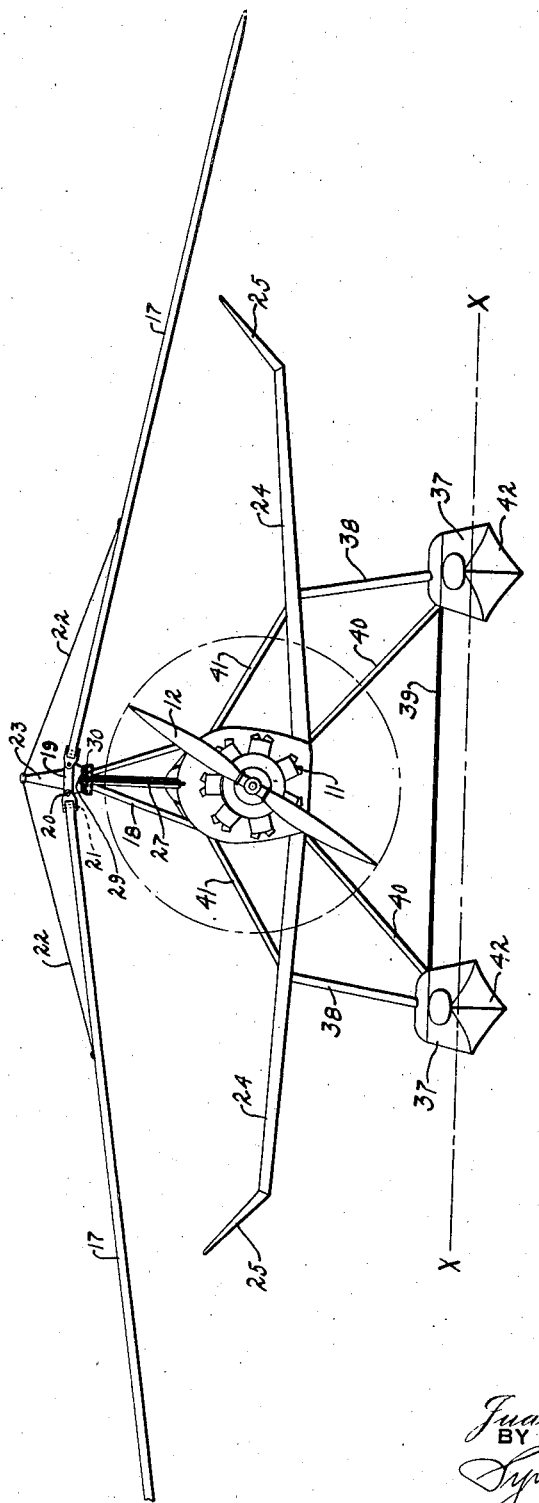
Figure 2 is a front elevational view of the craft of Figure 1.

Referring first to the arrangement shown in Figures 1 and 2, the reference numeral 8 designates the body or fuselage of a craft having a pair of open cockpits 9—10. In addition to the more or less usual engine and propeller 11—12 and the empennage structure including fixed vertical and horizontal surfaces 13—14 and movable or controllable vertical and horizontal surfaces 15—16, the craft has, as its primary means of sustention, a system of rotatable blades or wings 17 which, as shown, are mounted above the forward cockpit 9 as by means of a plurality of post or leg elements 18. The rotor system further includes pivotal mountings for the several wings or blades. As shown, each blade 17 is connected or secured to an axis or hub structure 19 by means of a horizontal pivot pin 20 and a vertical pivot pin 21 and the blades are prevented from drooping excessively, when at rest, by means of supporting cables 22 which are connected therewith and also with an upward extension 23 of the axis structure 19.

The craft of Figures 1 and 2 further preferably includes laterally extended and supplemental fixed lifting surfaces 24 having upturned tip portions 25 to afford certain stability. The supplemental surfaces 24 also serve to carry ailerons 26. I do not herein claim per se the supplemental fixed wing arrangement, although I do claim certain novel combinations including the fixed wing structure as hereinafter more fully described.

For the purpose of initiating rotation of the rotor prior to take-off, I prefer to employ a starter mechanism including shafting 27, coupled at its lower end with the engine 11 by a clutch device 28 and at its upper end with the hub structure 19 by a pinion 29 and a ring gear 30. The rotor is also provided with a braking mechanism in order to slow down and stop the rotation of the blades after making a landing. This mechanism is indicated at 31 and is provided with a suitable operating connection 32 extended downwardly, preferably along one of the rear pylon legs 18, for connection with an operating member or lever 33 mounted in the rear or pilot's cockpit 10. The rotor starter clutch 28 is also preferably arranged for control by means of the lever 33 and for this purpose I have provided a cable 34 extended from the clutch operating arm 35 rearwardly and over suitable pulleys 36 to a point on the lever 33. The rotor starter clutch and the rotor brake, therefore, are both operable by the same control element and the arrangement, furthermore, is such as to provide an interlock between these two controls. This particular arrangement, however, forms no part of the present invention per se, but is described and claimed in the copending application of Harold F. Pitcairn, Serial No. 547,203, filed June 27th, 1931.

This invention, as brought out above, also contemplates the use of alighting mechanism adapted to permit landing on and take-off from a body of water and, in accordance with the arrangement of Figures 1 and 2, the alighting or landing mechanism takes the form of a pair of widely spaced pontoon or float devices 37 which are preferably braced to the supplemental fixed lifting surfaces 24 at points spaced outwardly substantially from the body of the craft. For this purpose I employ the struts 38. The floats 37 may also be interbraced as by the element 39 and further connected with the body of the craft by struts 40. In order to strengthen the fixed wing structures, additional diagonal struts 41 are extended upwardly and inwardly from points adjacent to the upper ends of the struts 38 to be connected with structural members in an upper portion of the fuselage.

Turning now to the floats themselves, it will be observed that, according to this invention, the floats have relatively deep V-form bottoms 42. Such floats, in addition to being widely spaced are also of relatively great displacement or capacity and thus provide a wide and stable base of support for the craft on the water in order to reduce the danger of tipping at times while the rotor is turning when on the water. It will also be observed that the floats are so set or angled longitudinally of the craft as to provide for support in a position in which the general path of travel of the rotor blades is substantially horizontal.

Furthermore, and as best seen in Figure 1, the float structures, since they are not of the stepped configuration, but have relatively large forward portions and relatively small rear portions, with gradually tapering surfaces interconnecting the two, are highly efficient aerodynamically. The floats are also tapered upwardly on the lower surfaces thereof toward the rear, so that in take-off, the craft may be very materially upwardly and forwardly tilted or angled, by means of the elevator surfaces 16, even at very low forward speeds. This angling will be more apparent from a comparison of the two water level lines indicated in Figure 1 at $x$—$x$ and $y$—$y$. The line $x$—$x$ designates the water line on the float devices when the craft is at rest, while the line $y$—$y$ indicates more or less diagrammatically the approximate angled position to which the craft may be shifted in take-off, it being noted that this position may be assumed even during very low forward speed of the craft in the water, since the configuration of the floats as well as their location with respect to the center of gravity of the craft are so arranged as to facilitate the tilting.

The craft of Figures 1 and 2 (see Figure 1 particularly) is also equipped with controlling means 43 for the vertical air rudder 15, a suitable connection 44 being extended from the rudder to the control means. The part 43 is pivoted at 45 and is also connected, below its pivot, by means of a cable 46 with water rudder elements 47 which are mounted at the rear ends of the floats. While only one rudder pedal 43 is illustrated, it will be understood that the customary pair of pedals with connections to both sides of air and water rudders is contemplated. The cable 46 may suitably be extended adjacent to a strut 40 and also passed over one or more pulleys 48, in order to provide extension of the cable 46 in the proper direction along a side of the float. By this arrangement, the air and water rudders are both operable by the same control means and thus the action of each supplements that of the other.

As brought out above, the rudder means, particularly the elements 47 which react in the water, may be employed during application of a rotative effort to the rotor through the starter connection 27, in order to counteract the reverse torque set up in the body of the craft. Thus, the craft may readily and conveniently be maneuvered to a proper take-off position during initiation of the rotation of the rotor, even in a very restricted space. Similarly, upon making a landing, the rudder means, particularly the elements 47, may be employed to maintain the craft in the proper position with respect to a wind and may also serve to maneuver the ship to the best possible position for slowing down or stopping the rotor, especially in gusty air.

In Figures 3 to 7 inclusive, I have illustrated an application of various features of this invention to two different forms of craft of the flying boat type. The craft of Figures 3 and 4 includes a body 49 having a suitable occupants' compartment formed therein and the lower portion of the body takes the form of a hull structure of relatively deep V-form as clearly illustrated in the figures at 50. This craft, similarly to the craft of Figures 1 and 2, is provided with a rotor system of pivotally and rotatably mounted sustaining blades or wings 17$a$ mounted above the body 49 as by means of struts or posts 51 which terminate at their lower ends in a structure 52 for mounting the forward propulsion engine 53. The structure 52, and the engine 53, in turn, are supported above the body of the craft by means of struts 54 which are arranged in a triangulated fashion with respect to each other and also with respect to other structural elements of the craft including the rotor supporting posts 51.

The hub 19$a$ for the rotor is mounted at the upper and converging ends of the posts 51 and the attachment of the blades 17$a$ to the hub structure includes, as in Figures 1 and 2, horizontally and vertically disposed pivots 20$a$ and 21$a$, respectively. In accordance with the structure of Figures 3 and 4, however, the blades are supported as against excessive drooping, when they are not rotating at flight speeds or when they are at rest, by means of abutments 55 which are arranged to contact with a portion of the hub 19$a$ when the blades swing downwardly about their horizontal pivot pins 20$a$.

The engine 53, of course, is equipped with a propeller 56 and in order to provide ample clearance for normal operation of the propeller the body of the craft is cut away or brought down just rearwardly of the occupants' compartment as indicated at 57. From this point, a relatively small body or hull extension 58 extends rearwardly to support an empennage structure including fixed vertical and horizontal stabilizing surfaces 59 and 60, respectively, and manually controllable rudder and elevator surfaces 61 and 62, respectively. The horizontal surfaces 60 and 62 may be braced by means of the elements 63 extended downwardly and inwardly therefrom to the rear extension 58 of the body.

While the rotor system above described constitutes the primary sustention means for the craft, I also prefer to employ supplemental fixed lifting wings 64—64 extended laterally at opposite sides of the body 49, preferably from a point adjacent to the engine 53 and thus in the neighborhood of the longitudinal center of gravity of the craft. As described above in connection with Figures 1 and 2, these wings are employed not only to support aileron and stabilizing surfaces but also to support float devices 65 which, in the construction of Figures 3 and 4, serve to supplement the action of the primary float or hull structure 50. The floats 65, similarly to the hull structure 50, are of relatively deep V-form for the purpose already considered, and they are connected with the fixed wing structures by struts 66 and 67, which are preferably arranged to support them at a level which is relatively low as compared with the commonly accepted practice in fixed wing flying boats and the like. That is, the floats 65 are positioned very low with respect to the normal water line $x$—$x$, so as to give them a very substantial balancing action as against transverse or lateral tilting of the craft in the water. This is of especial advantage in this modification of the invention, in which the fixed wings are placed quite low.

In this connection (see Figure 4), it might be noted that the floats are located sufficiently low to produce a cumulative effect during tilting of the craft toward either side. In other words, the floats are arranged so that in normal or mid-position of the craft both floats are at least partially submerged in the water, the result being that in case the craft is tilted toward either side, the float on that side is further submerged and its displacement thus increased, while the float at the opposite side at least partially comes out of the water and its displacement is decreased. With supplemental floats of relatively large displacement arranged in the manner just referred to, a very substantial lateral balancing action is produced.

The fixed wing structures are preferably braced to the hull by means of members 68 and also, in the preferred embodiment, to the rotor mount by the guys 69. By employing tension elements for the members 68 and 69, adequate bracing of the rotor mount and fixed wings is afforded even though the compression members incorporated in the wings and the mount are of relatively light construction.

Figure 3:
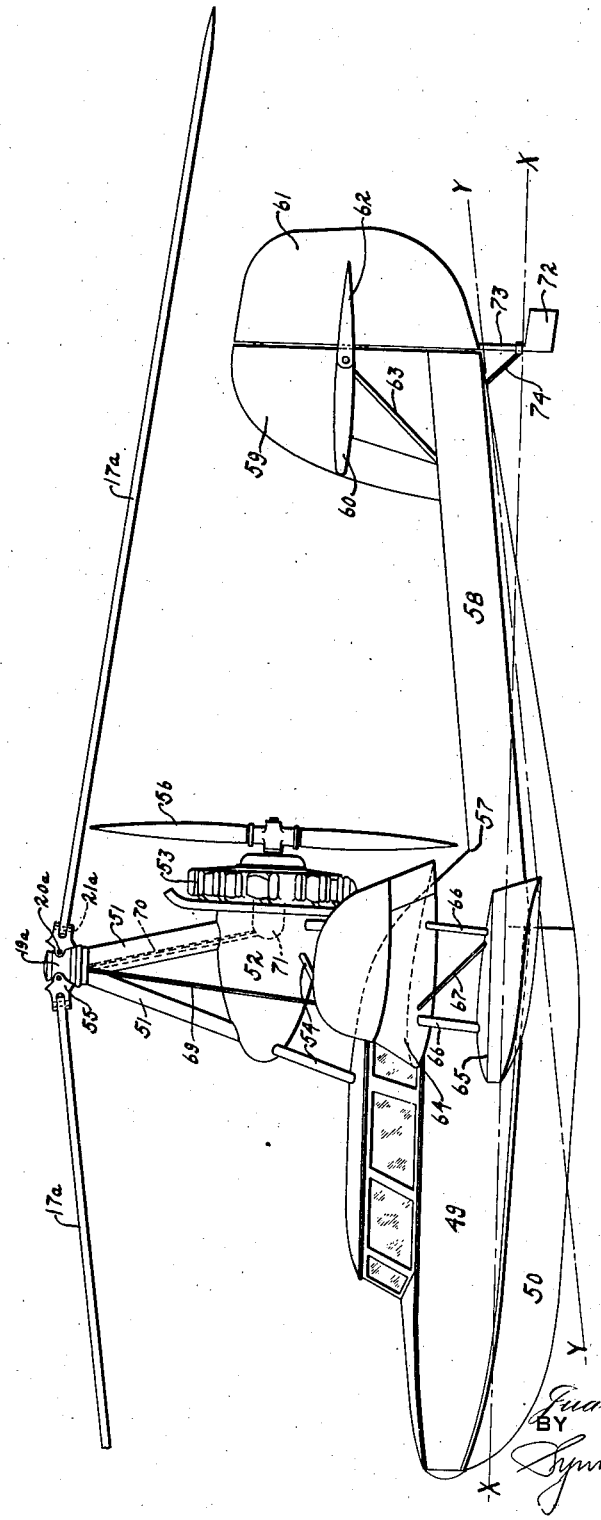
Figure 3 is a side elevational view of a flying boat constructed in accordance with this invention.
Figure 4:
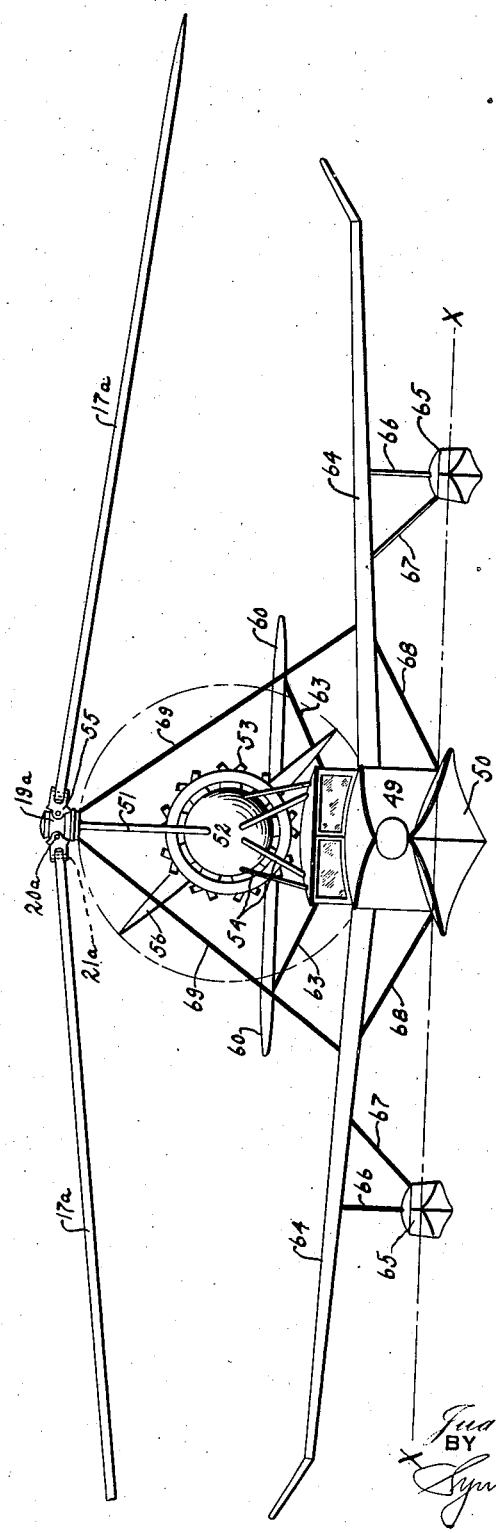
Figure 4 is a front elevational view of the craft of Figure 3.

For the purpose of starting or imparting an initial rotative effort to the blades 17a, the construction of Figures 3 and 4 provides for a connection 70 extended downwardly from the rotor hub 19a to a power take-off device diagrammatically indicated at 71 located adjacent to the engine 53. A rotor brake may also be provided in accordance with the arrangement of Figures 3 and 4, and in order to counteract the reverse torque set up during application of the brake or operation of the starter, I have provided a water rudder 72 mounted for movement with the air rudder 61. An extension 73 for the pivot of the rudder 61 may serve this purpose and the extension may conveniently be braced as by the member 74. Simultaneous actuation of the air and water rudders 61 and 72 may be had by means of the usual operating cable (not shown) connected with the rudder 61 and extended forwardly to a manual control positioned in the occupants' compartment in the body 49.

In considering various features incorporated in the craft of Figures 3 and 4, it is first to be observed that the float structures employed, being of relatively large capacity and also of deep V-form, serve to permit steep descent of the craft to the water, since the landing shocks will be effectively cushioned or dispersed. The primary float structure, that is, the hull 50, furthermore, is of a highly efficient aerodynamical shape so that the efficiency of the craft in general is improved.

Furthermore, since the supplemental float structures are relatively widely spaced and also set down low with respect to the normal water line, a wide base of support for the craft is provided, this being of advantage, especially in windy or gusty air, in preventing lateral tilting of the craft. At this time, attention is again called to the fact that in a craft of the type herein disclosed, lateral tilting of the general path of travel of the rotor blades upwardly against a relative wind, greatly increases the lift of the rotor and it will be observed that by constructing the float means in the manner above brought out, the craft is maintained in a position in which the general path of travel of the rotor blades is substantially horizontal, the result of this being maintenance of the lift of the rotor at a relatively low value until such time as the R. P. M. of the rotor may be reduced and stopped.

The action of the water rudder 72 is also similar to that brought out above in connection with the craft of Figures 1 and 2 although it might be noted that it is of considerable advantage to join the air and water rudders in the manner disclosed so that, when on the water, the action of the air rudder 61 supplements the action of the water rudder 72.

Attention is also called to the fact that arrangement of the engine and propeller 53 and 56 after the fashion of a "pusher", thus bringing the propeller relatively close to the surfaces of the tail structure, materially enhances the function of the rudders in counteracting the reverse torque set up during starting of the rotor as well as when applying the rotor brake.

The body or cabin structure including the hull portion 50 and the cut away rearward extension 58, when arranged in the manner indicated, is also of advantage since it permits mounting of the engine at a relatively low point and thus avoids an abnormally high center of gravity. At the same time, this relatively low mounting of the engine provides ample clearance between the disc of the propeller 56 and the path of travel of the rotor blades, it being noted in this connection, that as viewed in Figures 3 and 4, the blades or wings 17a are illustrated in drooped position. In normal flight operation they may take positions coned upwardly substantially as illustrated in Figure 6 to be described more fully hereinafter.

The arrangement of Figures 3 and 4 also provides other advantages, among which might be mentioned simplicity and strength in the combined engine and rotor mounting structure and utilization of a well streamlined and efficient rotor head structure including positive stops for limiting drooping of the blades in place of the droop cables illustrated in Figures 1 and 2.

Figure 5:
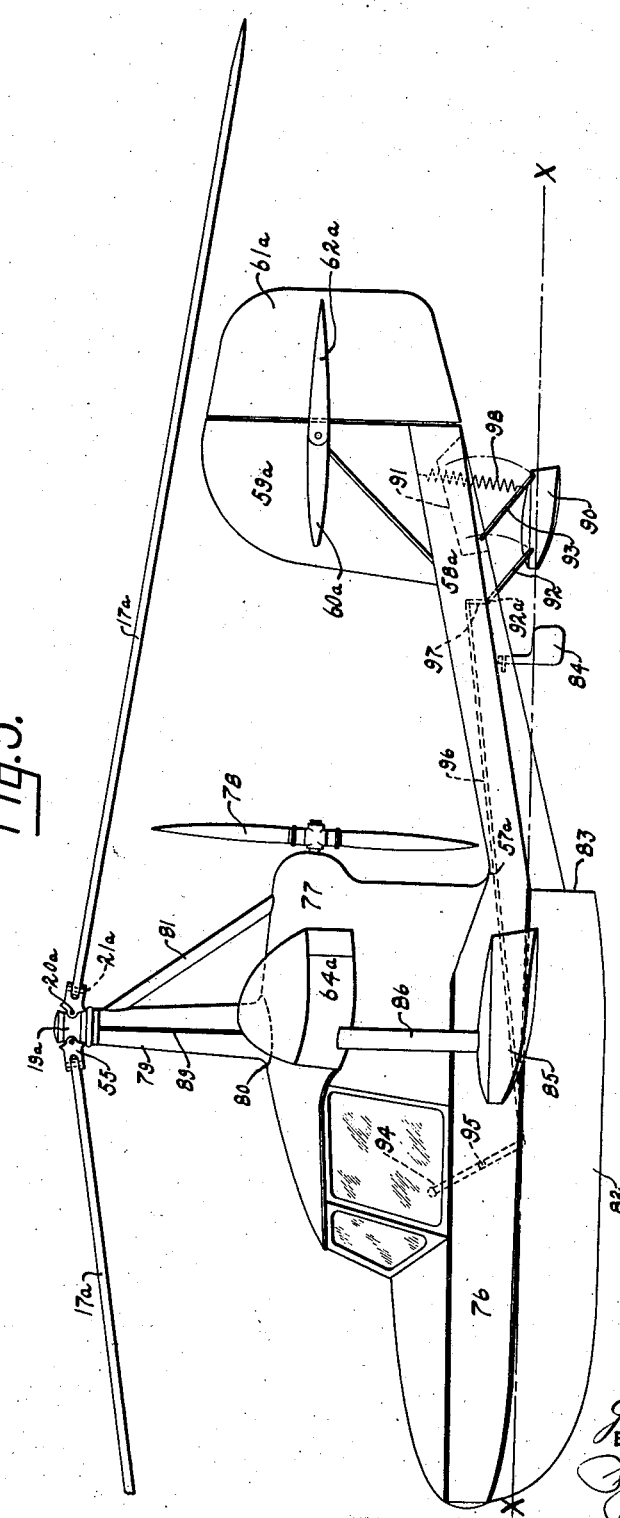
Figure 5 is a view similar to Figure 3 but illustrating a modified type of flying boat.
Figure 6:
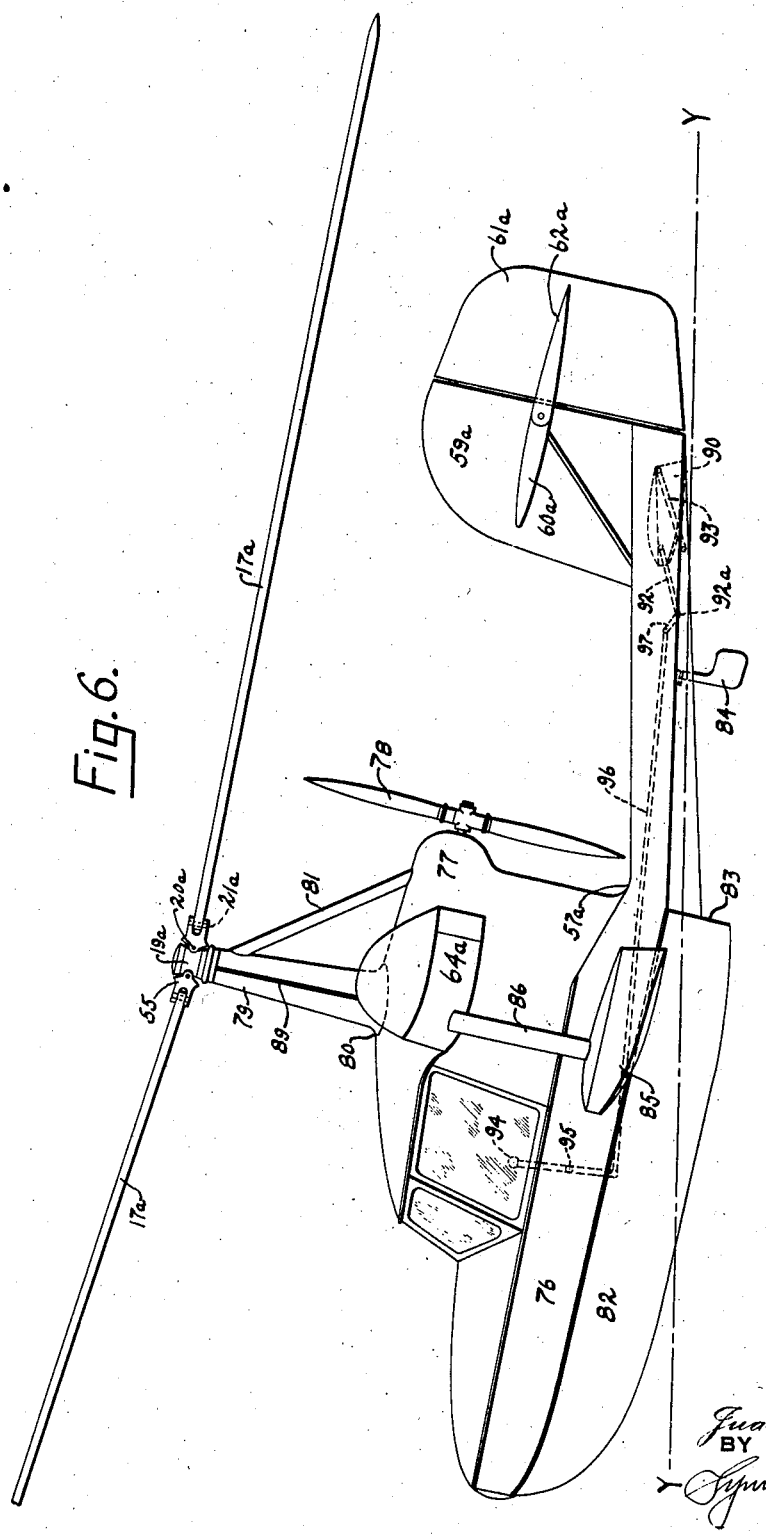
Figure 6 is a view of the craft of Figure 5, in a substantially differently angled position on the water.

In Figures 5, 6 and 7 I have illustrated still another embodiment of various features above considered. The craft of these figures is also of the flying boat type and is provided with a rotor hub and blade or wing structure very similar to that illustrated in Figures 3 and 4 and described above. Similar reference characters have, therefore, been applied to the hub and blade structure shown in Figures 5, 6 and 7.

The hull or body 76 of this craft, however, takes a somewhat different form, particularly with respect to certain arrangements which have been provided for mounting the engine. In this construction, toward the rear of the main part of the body, a somewhat upwardly positioned housing 77 is provided for enclosing a forward propulsion engine. This engine is connected with a suitable propeller 78 which, as in Figures 3 and 4, is of the pusher type, and the rotor mounting structure takes the form of a vertically extended pylon or post 79 which is faired at its lower end as at 80 into the upper surface or roof of the cabin or body. A diagonal brace 81 may be extended rearwardly and downwardly from an upper portion of the mount 79 for connection with structural elements in the body of the craft adjacent the engine.

The primary float or hull structure of this craft is also of very deep V-form as indicated, particularly in Figure 7, at 82 and as here shown this hull is of stepped configuration as indicated at 83 in Figures 5 and 6. A relatively short and rather highly angled rear extension 58a is also joined with the body of the craft just below the disc of the propeller 78, this extension also being deeply cut back as at 57a to provide ample clearance for the propeller and thus permit mounting of the engine relatively low.

At the rear end of the extension 58a the usual vertical and horizontal fixed surfaces 59a—60a and vertical and horizontal controllable surfaces 61a and 62a are also provided. Instead of mounting the water rudder 84 on the axis of the air rudder 61a, as shown in Figure 3, I have arranged the rudder 84 to depend from the extension 58a at a point substantially midway between the empennage structure and the rear portion of the body proper. The rudder 84, of course, may be suitably connected for simultaneous actuation with the air rudder in a manner similar to that described above in connection with the craft of Figures 1 and 2.

Supplemental fixed lifting surfaces 64a are also employed in the boat of Figures 5, 6 and 7 but, as compared with the arrangement of Figures 3 and 4, these fixed lifting surfaces are extended laterally at a considerably greater height above the normal water line. The supplemental floats 85 of this form, these floats also being of relatively large capacity and having deep V-form bottom surfaces, are widely spaced apart and connected or braced to the fixed wings 64a by the struts 86. Additional struts 87 are extended generally horizontally from the floats to the body 76 and diagonal tension braces 88 serve to interconnect the hull and the fixed wings, these latter elements being connected with the fixed wings at points preferably adjacent to the upper ends of the struts 86. At the upper sides of the fixed wings, additional tension elements 89 extend inwardly and upwardly for connection with the rotor mount preferably adjacent to the hub 19a thereof. As in Figures 3 and 4, therefore, the fixed wings, the rotor mounting and the hull structure are efficiently interconnected by a tension system so that the compression elements employed in the wings themselves as well as in the rotor mount proper need not be of excessive weight.

In order to provide a positive control for the angular position of rest of the craft on a body of water, I have equipped the craft of Figures 5, 6 and 7 with a retractable float 90 located toward the rear end of the hull extension 58a, the latter being provided with a recess or cavity 91 to receive the float when in retracted position. This float, see Figures 5 and 6 particularly, is supported by means of levers 92 and 93 which are pivoted not only to the float itself but also to the extension 58a. The levers, furthermore, are made of such length as to provide for swinging movement of the float 90 between the positions shown in Figures 5 and 6. For the purpose of actuating this float, I have equipped the craft with a manually operable lever 94 pivoted as at 95 and connected, at its lower end, as by means of the push rod 96, with crank 97, the last named element being mounted for movement with the lever 92 about its pivot point 92a. Thus when it is desired to extend the float, the pilot or operator moves the upper portion of the lever 94 forwardly and this in turn moves the lever or arm 92 about its pivot 92a to swing the float downwardly to the position shown in Figure 5. The float may also be retracted by a reverse movement of the lever 94 and, in order to ensure retention of the float in the cavity 91, in normal flight operation, I prefer to employ a tension spring 98 connected with the float or one of its supporting arms as indicated, for example, in Figure 5.

While various characteristics of this craft are quite similar to those described above in connection with the craft of Figures 3 and 4, in this arrangement the primary float structure is of stepped formation and it is noted in this connection that I have utilized this formation in combination with certain other features in such manner as to provide for support of the craft at rest on a body of water in two different angular positions. One of these positions is such as to maintain the general path of travel of the rotor blades substantially horizontal, this in turn keeping the lift of the rotor at a low value. Thus in making a steep or vertical landing the tail float 90 may be extended to the position illustrated in Figure 5 and the craft may then be brought down even vertically on to the water, the tail float serving to maintain the craft in level or substantially horizontal position. In take-off the float 90 may be retracted into the cavity 91 and the craft may then be supported in a position in which the general path of travel of the rotor blades is angled very substantially upwardly and forwardly. This upward and forward angling of the rotor is further increased by virtue of the high angle of the hull extension 58a. When tilted to this position (see Figure 6) the craft will leave the water not only after a very short run and at a slow forward speed but also at a very steep angle.

It is to be understood in connection with the foregoing that I contemplate arranging the floats and the hull structure of the craft of Figures 5, 6 and 7 either in such manner as to provide for support, when at rest, in an upwardly angled position unless the tail float is extended or in such manner as to provide for support, when at rest, in either one of the two positions. With the former arrangement, the center of buoyancy with relation to the center of gravity of the craft as a whole will be located forwardly as compared to its location for the latter arrangement. In each instance, however, the center of gravity location will be related in a certain particular manner with respect to what might be termed the center of buoyancy of the hull and floats. If the craft is arranged for normal support in an angled position, of course, the float 90 must be extended in order to provide the level or horizontal position, while in the other arrangement, when it is desired to shift from a level to an angled position, the elevator surfaces 62a may be employed to deflect slipstream and cause the desired angular shift.

The craft of Figures 5, 6 and 7 may also be equipped with means for initiating rotation of the rotor blades as well as means for retarding or stopping their rotary motion, and when such devices are employed, the water rudder 84 will be manipulated in a manner similar to that described above for the purpose of counteracting the effect of the reverse torque.

According to the foregoing, therefore, I have provided a craft which is capable of efficient and easy operation from a body of water, the various structural features above considered all being arranged to facilitate making take-offs at high angles and low forward speeds and, therefore, from a very restricted area. Furthermore, provision is made for very steep and even vertical descent to a landing on a very small body of water. All of the various forms of craft are additionally arranged for efficient and easy maneuvering and the construction thereof is such that high efficiency is obtained.

Finally, it should be noted that in accordance with this invention an aircraft may be landed on and taken off a body of water not only readily and efficiently but also with a degree of safety which is not possible with any other type of aircraft designed for similar operation.

What I claim is:—

1. An aircraft having, as its primary sustention means, a rotor system of pivotally and rotatably mounted sustaining wings or blades, arranged for normally free actuation by relative air flow in flight, alighting mechanism providing for support of the craft on a body of water, a prime mover for the craft, starter means for initiating rotation of the sustaining blades prior to take-off adapted to transmit a rotative effort from the prime mover to the rotor, and torque counteracting mechanism mounted on said craft reacting with the water to counteract the reverse torque set up during transmission of said rotative effort.

2. An aircraft having, as its primary sustention means, a rotor system of pivotally and rotatably mounted sustaining wings or blades, arranged for normally free actuation by relative air flow in flight, alighting mechanism providing for support of the craft on a body of water, a prime mover for the craft, means for applying a braking effort to the sustaining blades and torque counteracting mechanism mounted on said craft reacting with the water to counteract the reverse torque set up during application of said braking effort.

3. In an aircraft including float means, a primary sustaining system of flexibly and rotatably mounted wings arranged for actuation by relative air flow in flight, a starter for the sustaining system, a brake for said system, air and water rudder means, and common control means for both the rudder means arranged for control of the craft in flight and on the water and to counteract, upon forward movement of the craft through the water, reactive torque set up in the craft upon operation of the rotor starter and brake means.

4. In an aircraft including float means, a primary sustaining system of flexibly and rotatably mounted wings arranged for actuation by relative air flow in flight, a starter for the sustaining system, a brake for said system, air and water rudder means, common control means for both the rudder means arranged for control of the craft in flight and on the water and to counteract, upon forward movement of the craft through the water, reactive torque set up in the craft upon operation of the rotor starter and brake means, and means whereby the craft may be tilted between a position where the average rotational path of the rotor is substantially horizontal and a position where said path is inclined to the horizontal, said water rudder means being so located as to be at least partially submerged in the water with the craft in either of said positions.

5. An aircraft of the flying boat type having, as its primary sustention means, a rotor system of pivotally and rotatably mounted sustaining blades or wings arranged for normal actuation by relative air flow, an upwardly extended mounting structure for the rotor, a boat-like hull structure, supplemental fixed lifting surfaces at the sides of the craft, float means braced to said fixed surfaces, at points spaced substantially from the body of the craft, and means interbracing the rotor mounting structure and the said fixed surfaces at points on the latter adjacent to the bracing points for the float means.

6. An aircraft of the flying boat type having, as its primary sustention means, a rotor system of pivotally and rotatably mounted sustaining blades or wings arranged for normal actuation by relative air flow, an upwardly extended mounting structure for the rotor, a boat-like hull structure, supplemental fixed lifting surfaces at the sides of the craft, float means braced to said fixed surfaces, at points spaced substantially from the body of the craft, and means interbracing the rotor mounting structure, the said fixed surfaces, the hull and said float means.

7. In an aircraft including float means, a primary sustaining system of flexibly and rotatably mounted wings arranged for actuation by relative air-flow in flight, a starter for the sustaining system, air and water rudder means, and common control means for both the rudder means arranged for control of the craft in flight and on the water and to counteract, upon forward movement of the craft through the water, reactive torque set up in the craft upon operation of the rotor starter.

8. In an aircraft including float means, a primary sustaining system of flexibly and rotatably mounted wings arranged for actuation by relative air-flow in flight, a starter for the sustaining system, water rudder means for the craft, control means for the rudder means for counteraction, upon forward movement of the craft through the water, of the reactive torque set up in the craft upon operation of the rotor starter, and means whereby the craft may be tilted between a position where the average rotational path of the rotor is substantially horizontal and a position where said path is materially inclined to the horizontal, said rudder means being so located as to be at least partially submerged in the water with the craft in either of said positions.

JUAN DE LA CIERVA.